E. LEGLER.
JELLY DEPOSITING ATTACHMENT FOR CAKE ICING MACHINES.
APPLICATION FILED JUNE 16, 1916.

1,260,558.

Patented Mar. 26, 1918.
5 SHEETS—SHEET 1.

INVENTOR
Edward Legler.
BY
ATTORNEYS

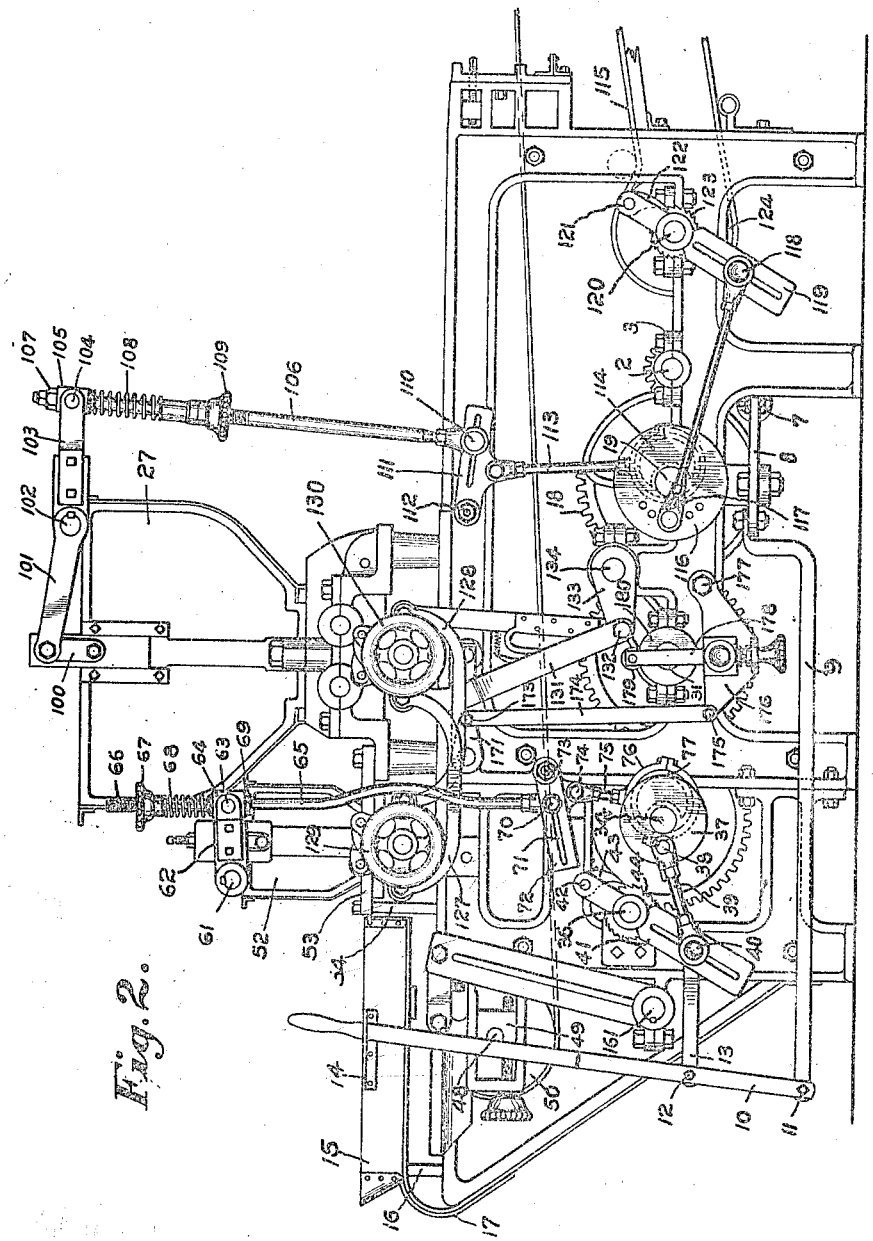

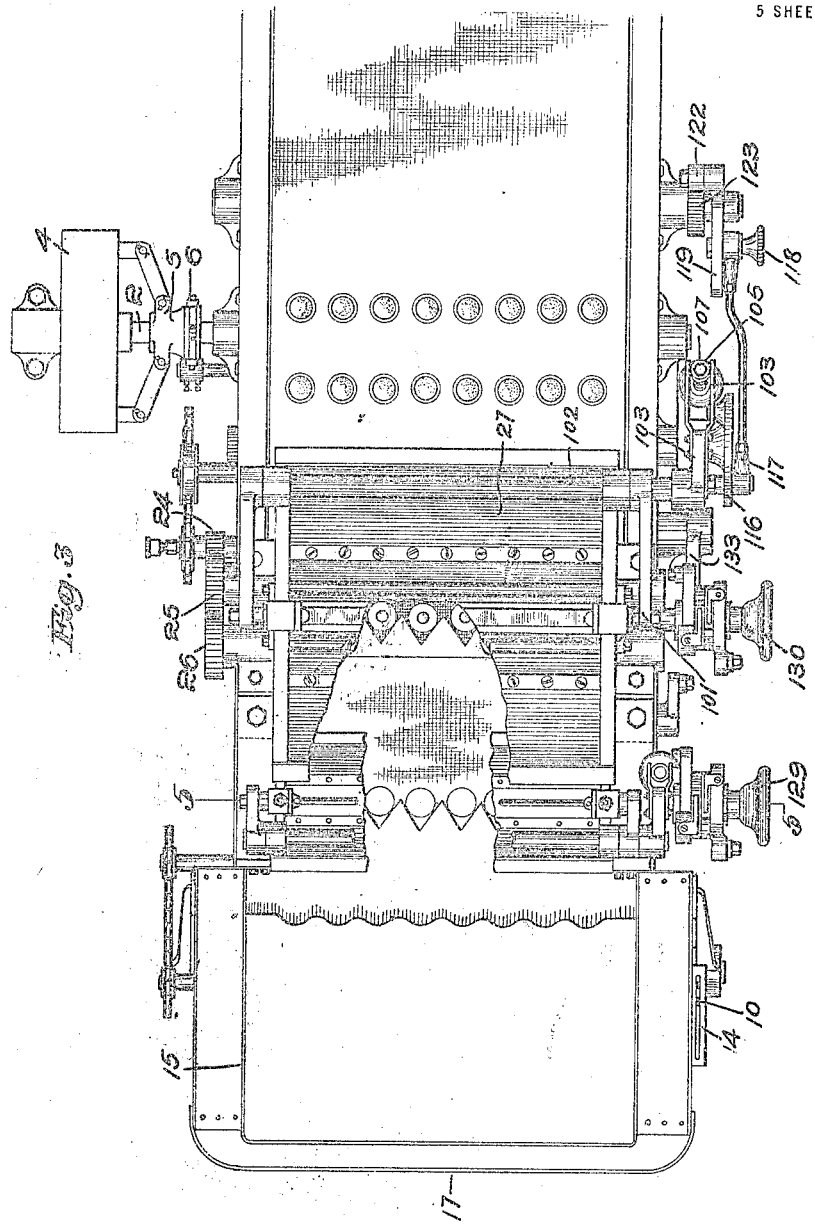

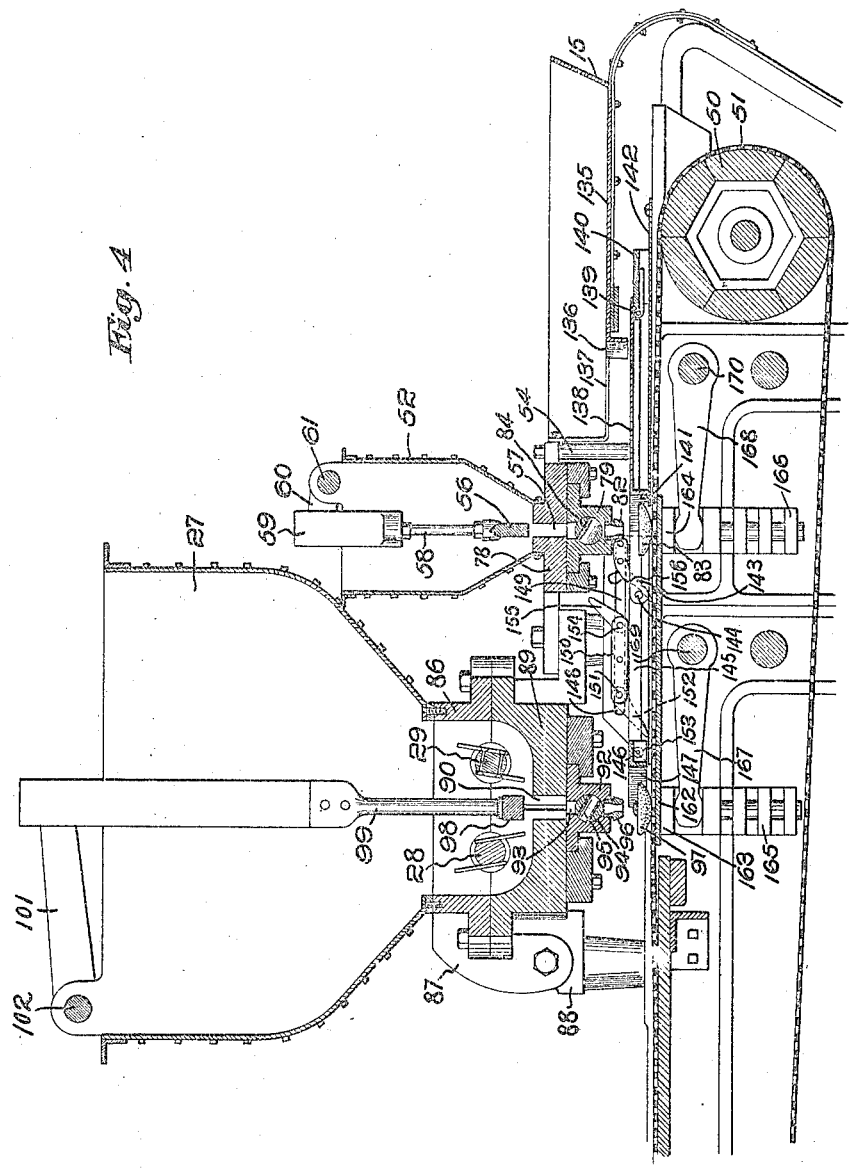

E. LEGLER.
JELLY DEPOSITING ATTACHMENT FOR CAKE ICING MACHINES.
APPLICATION FILED JUNE 16, 1916.
1,260,558.
Patented Mar. 26, 1918.
5 SHEETS—SHEET 5.
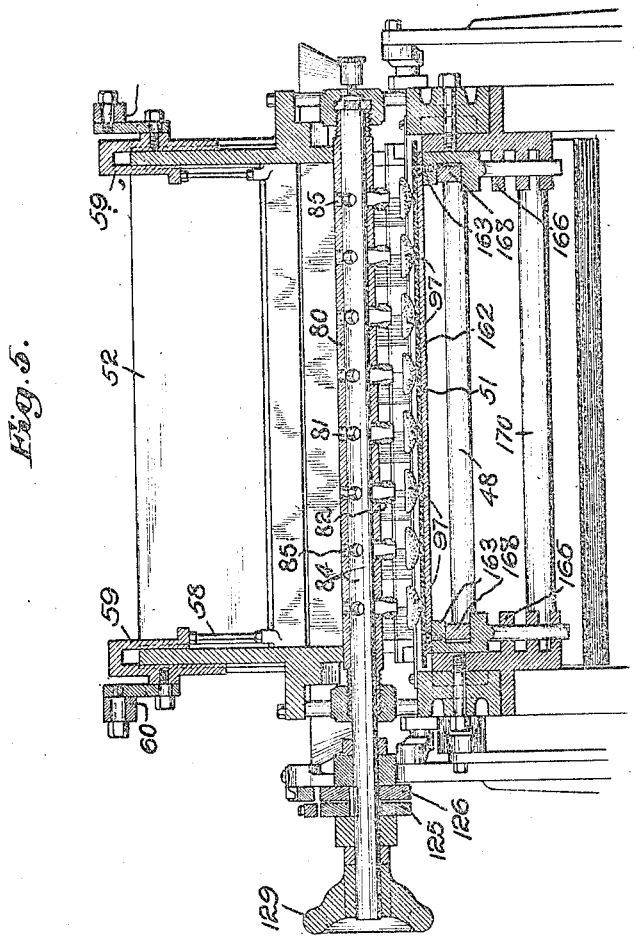
INVENTOR
Edward Legler.
BY
Emery Booth Janney and Varney
ATTORNEYS.

UNITED STATES PATENT OFFICE.

EDWARD LEGLER, OF KANSAS CITY, KANSAS, ASSIGNOR TO LOOSE-WILES BISCUIT COMPANY, OF LONG ISLAND CITY, NEW YORK, N. Y., A CORPORATION OF NEW YORK.

JELLY-DEPOSITING ATTACHMENT FOR CAKE-ICING MACHINES.

1,260,558.  Specification of Letters Patent.  Patented Mar. 26, 1918.

Application filed June 16, 1916. Serial No. 104,111.

*To all whom it may concern:*

Be it known that I, EDWARD LEGLER, a citizen of the United States, and a resident of Kansas City, in the county of Wyandotte and State of Kansas, have invented an Improvement in Jelly-Depositing Attachments for Cake-Icing Machines, of which the following description, in connection with the accompanying drawings, is a specification, like characters on the drawings representing like parts.

This invention relates to machines for depositing coating material upon food products, and particularly to machines for depositing jelly and icing upon cakes.

In order that the principles of the invention may be readily understood, I have disclosed a single embodiment thereof in the accompanying drawings, wherein—

Fig. 2 is a left-hand side elevation thereof;

Fig. 3 is a plan view thereof;

Fig. 4 is a longitudinal vertical section thereof; and

Fig. 5 is a transverse section upon the line 5—5 of Fig. 3 and looking toward the right in said figure.

Figure 1:
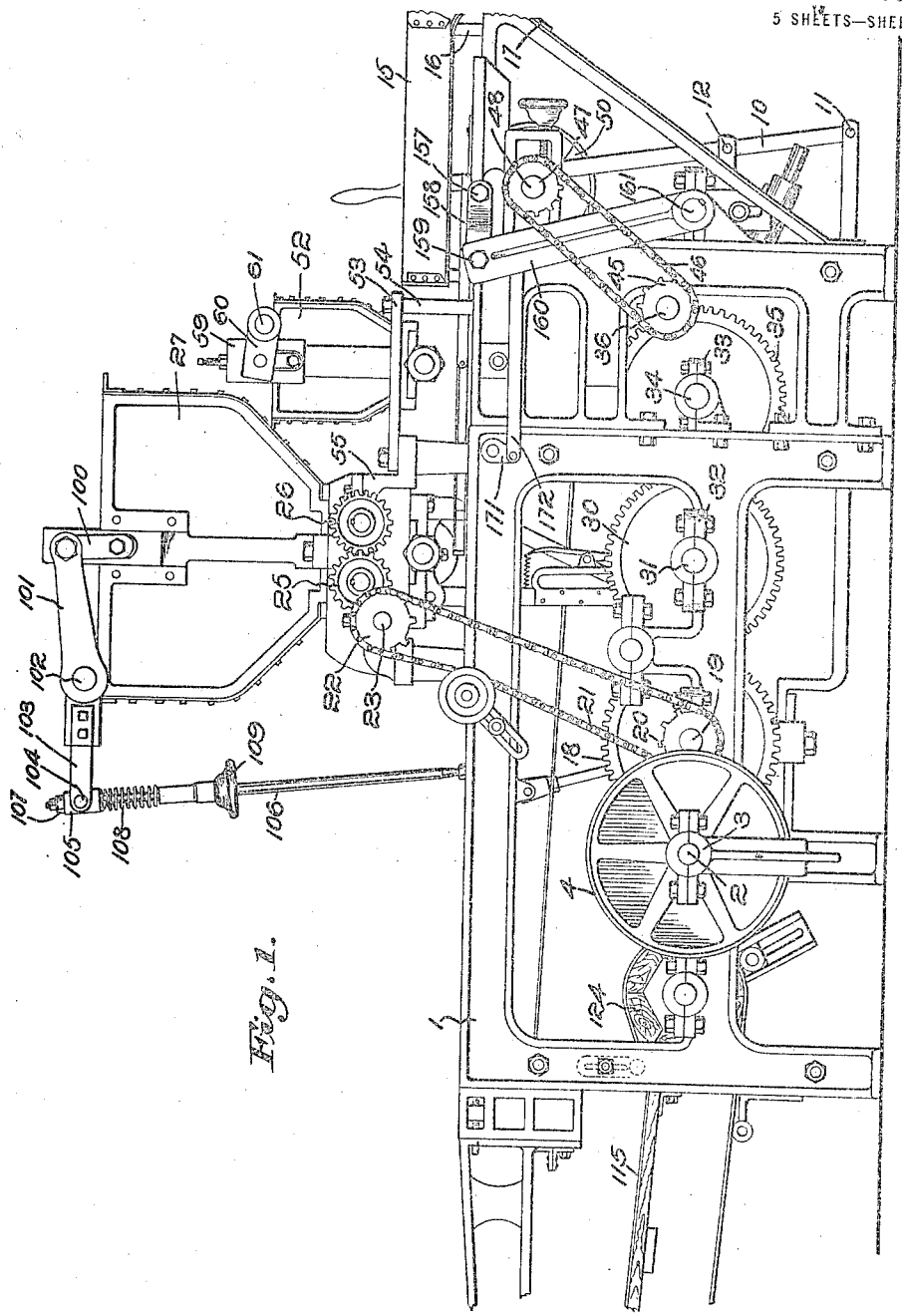
Figure 1 is a right-hand side elevation of an apparatus constructed in accordance with my invention.

In my Patent No. 1,164,944, dated December 21, 1915, I have disclosed one embodiment of means for depositing marshmallow upon cakes. My present invention, although not limited thereto, relates to means for first depositing some substance, such as jelly, upon cakes and thereafter, preferably in the manner disclosed in said patent, for depositing marshmallow upon the jelly upon said cakes. While preferably the apparatus herein disclosed is used for this purpose, I may deposit other materials from the plurality of hoppers disclosed, as, for example, materials contrasting in color or other characteristics. It is, however, particularly advantageous to preliminarily deposit jelly upon the cakes, inasmuch as I thereby prevent the cakes from becoming dry, as well as adding to the taste and flavor thereof.

Referring more particularly to the drawings, the framing of the machine is indicated at 1, it being preferably a skeleton frame composed of suitable uprights with cross members, which need not be particularly described. In the disclosed embodiment of my invention, I have represented a number of parts substantially as they are disclosed in my said patent, and it will be unnecessary to describe the same in entire detail.

The main drive shaft is indicated at 2 in the several figures, it being mounted in suitable bearings 3 in the frame and having thereon a driving pulley 4, which is normally loose on said shaft, but is adapted to be clutched thereto by clutch mechanism 5, which may be and preferably is similar to that disclosed in my said patent, and which need not be more specifically described. The lever 6 of the clutch mechanism is connected by a cross rod 7 with a bell crank lever 8, itself connected by a longitudinally extending link 9 with an operating lever 10 pivoted thereto at 11 and itself pivoted at 12 upon the bracket 13 extending from the machine frame. The said starting and stopping lever, as shown in my said patent, extends through a slotted guide 14 secured to one side of the hopper 15, the latter being mounted upon suitable supports 16 rising from the machine frame and provided with a guard 17.

The main drive shaft 2 has fast thereon a gear, not herein shown, meshing with a gear 18 fast upon a shaft 19 mounted in bearings in the machine frame and having thereon a sprocket gear 20, about which passes a sprocket chain 21. The said sprocket chain passes about a sprocket gear 22 fast upon the shaft 23. Fast upon said shaft 23, as clearly shown in Fig. 3, is a pinion 24 meshing with a gear 25, itself meshing with a gear 26 mounted upon suitable bearings in the lower portion of the main hopper 27 and having fast thereon agitators 28, 29. The said parts generally correspond to the corresponding parts in my said patent, and need not be more particularly described.

The shaft 19 has fast thereon a gear, not herein shown, meshing with and driving a gear 30 on a shaft 31 mounted in suitable bearings 32 in the machine frame. Mounted in bearings 33 in the machine frame is a shaft 34 having thereon a gear 35 driven in any suitable manner from the shaft 31 and preferably by a gear, not herein shown. Also suitably mounted in bearings in the machine frame is a shaft 36, which may be driven in any suitable manner from the shaft 34, and preferably by means of a crank disk 37 upon the shaft 34, and having connected thereto at 38 a crank arm 39 pivotally connected at 40 by means of a pin and slot connection or otherwise to a lever 41, itself loosely pivoted upon the said shaft 36 and having pivoted to its end at 42 a pawl 43 adapted to engage the teeth of the ratchet 44 fast upon the said shaft 36. By the described construction, or in any other suitable manner, an intermittent motion is imparted to the said shaft 36.

Upon the said shaft 36, as most clearly shown in Fig. 1, is a sprocket gear 45 about which passes a sprocket chain 46 also extending about a sprocket gear 47 on a shaft 48, herein shown as mounted in adjustable bearings 49 upon the machine frame. Upon said shaft 48 is a pulley 50, about which extends a suitable apron 51 generally similar to that disclosed in my said patent and upon which the cakes or other articles are adapted to be deposited to receive jelly and marshmallow or other deposits hereinbefore referred to. Any other suitable conveyer may, however, be employed.

In accordance with the disclosed and specific embodiment of my invention, to which, however, I am not in anywise limited, I provide means for depositing on cakes or other food products first a suitably jelly like substance that will retain its moisture for a prolonged period of time and will therefore correspondingly act upon the cakes or other food products, and also provide means for superimposing upon said jelly-like deposit an icing of marshmallow or other suitable substance. For this purpose, I have provided the hopper 27 corresponding generally to the hopper disclosed in my said patent and adapted to contain the marshmallow or other icing, and between the same and the hopper 15 I position another hopper 52 adapted to receive the jelly-like substance. The said hopper 52 is supported at its base by suitable longitudinally extending strips 53, shown in Figs. 1 and 2 as supported upon upright posts 54 at one end, and at the other end upon the base portion 55 of the hopper 27. As already stated, I preferably provide the hopper 27 with agitators, inasmuch as the marshmallow or other icing has comparatively little body, but is comparatively stiff and does not flow readily. The jelly with which the hopper 52 is supplied has, however, more body and weight, and I find it therefore unnecessary to provide the hopper 52 with agitators, although it is to be understood that the same may be employed, if desired. Said hopper 52 is provided with a plunger 56 adapted to enter a vertical opening 57 extending the entire width of the hopper and of the conveyer. The said plunger 56 so fits the opening 57 that when it rises therefrom after deposit of the jelly, suction is created within the opening 57 and the jelly flows therein. The plunger 56 has secured thereto a plunger rod 58, the upper end 59 whereof is, as shown most clearly in Fig. 5, of a somewhat U-shape, is suitably guided upon the walls of the hopper and is connected to rocker arms 60 mounted upon a shaft 61 upon the hopper frame and adapted to be operated in any suitable manner. For that purpose, as most clearly shown in Fig. 2, I have herein represented the shaft 61 as having fast thereon a rocker arm 62, the outer end of which is forked and is pivotally secured at 63 to the trunnions of a sleeve 64 mounted for sliding movement upon a rod 65. The upper end of the rod 65 is threaded at 66 to receive a nut 67 between which and said trunnion is a coil spring 68 surrounding said rod, a suitable lock nut 69 being provided beneath said trunnion. In the described manner or by any other suitable means, a yielding movement is imparted through the rod 65 to the rocker arm 62, and hence to the shaft 61 and the plunger 56.

The rod 65 may be reciprocated in any suitable manner. Preferably for that purpose the lower end thereof is pivotally connected at 70 by means of an elongated slot 71 to a rocker arm 72 pivoted at 73 upon the machine frame. Pivotally connected to said rocker arm 72 at 74 is a link 75 connected to an eccentric strap 76 surounding an eccentric 77 upon the shaft 34, whereby in the rotation of said shaft 34 rising and falling movements are imparted to said rod 65 and hence to the plunger 56.

Any suitable means may be provided to permit the discharge of the jelly like material from the hopper 52. For this purpose, the base portion 78 of the hopper 52 is provided with a valve casing 79 having a longitudinal bore or passage 80, most clearly shown in Fig. 5, and extending throughout the width of the hopper transversely of the machine. The said valve casing is provided with a series of article openings 81 terminating at their lower ends in nipples 82 through which the jelly is discharged directly onto the cakes 83 beneath and supported upon the apron 51. Within the valve casing is supported for intermittent rotary movement a cylindrical valve 84 having therein a corresponding series of openings 85 adapted intermittently to be placed in register with the openings 81 in the valve casing, thereby to permit the jelly to be forcibly ejected by the plunger 56 on the cakes or other food products supported therebelow.

The hopper 27 to contain the marshmallow or other icing is preferably constructed as disclosed in my said patent, it being provided with a basal frame 86 connected by hinge arms 87 to a stationary portion 88 of the frame. The frame 88 is provided with a portion 89 constituting the bottom of the hopper and which is provided with a vertical passage 90. Positioned therebelow and in connection therewith is a valve casing 92 similar to that disclosed in my said patent and having therein a series of other openings 93 and a longitudinal bore wherein is mounted the intermittently rotated cylindrical valve 94, itself provided with passages 95 adapted to permit the discharge of material through the nipples 96 onto the cakes 97 positioned therebelow upon the apron 51, the said cakes having already received their supply of jelly or other material from the hopper 52.

The hopper 27 is provided with a plunger 98 extending the full width of the hopper transversely of the machine and mounted upon a plunger rod 99, preferably suitably guided at its upper end in the walls of the hopper as disclosed in my said patent, and connected by a link 100 to a rocker arm 101 pivoted upon a shaft 102 upon the hopper wall. Fast upon said shaft 102 is a rocker arm 103 pivotally engaging trunnions 104 of a sleeve 105 slidingly mounted on a rod 106 having at its upper end suitable lock nuts 107. Surrounding said rod 106 below the sleeve 105 is a coil spring 108 held under suitable tension by a suitable nut 109 generally similar to that disclosed in my said patent. The said rod 106 is vertically reciprocated in a suitable manner, and preferably, as disclosed in my said patent, by being pivotally connected at its lower end at 110 to a rocker arm 111 pivotally connected to the machine frame at 112 and having pivoted thereto a link 113 operated by a suitable eccentric 114, shown in dotted lines in Fig. 2 and fast upon the shaft 19. In this or in any other suitable manner, reciprocating movement is imparted to the rod 106, and hence a yielding vertical movement is imparted to the plunger 99, thereby forcibly to eject the marshmallow or other icing from the hopper 27.

If desired and as disclosed in my said patent, I may also mount upon the said shaft 19 suitable means for driving the conveyer belt or apron 115, and for that purpose I have herein represented the same as having thereon a crank disk 116 to which is adjustably connected a crank arm 117 connected by a pin and slot connection 118 to a lever arm 119 loose upon the shaft 120. Upon the outer end of said arm is pivoted at 121 a pawl 122 to engage a ratchet 123 fast upon said shaft 120. Also fast upon said shaft 120 is a pulley 124 about which passes the conveyer belt 115 which is thus driven intermittently in a manner not herein necessary more fully to describe.

Preferably, though not necessarily, I provide means for imparting unison movement to the valves 84 and 94, thus causing their opening and closing movements to occur at the same time. For this purpose, I may provide each of said valves with a pair of ratchets, those for the jelly hopper valve being shown at 125 and 126 in Fig. 5, and those for the marshmallow hopper valve being similar to those shown in my said patent.

Preferably I employ pulleys similar to those shown in my said patent to operate the said ratchets and the corresponding pulleys are connected by links 127, 128, shown most clearly in Fig. 2. Each of said valves is preferably provided with a hand wheel 129, 130 to permit the hand manipulation of said valves.

In order to operate said valves mechanically, I connect to one of the pawl carriers for the marshmallow hopper valve a link 131 pivotally connected at 132 to a rocker arm 133 upon a shaft 134 suitably mounted in bearings in the machine frame and operated in any suitable manner, not herein necessary more fully to describe.

The cakes or other food product are deposited in the hopper 15, which is provided with a bottom 135 terminating at its forward end in a serrated guard 136, thus providing an opening 137 for the positioning of the cakes in proper order and as indicated in Fig. 4, upon the upper face of a pusher 138 pivotally connected at 139, so as to be capable of slight vertical movement, to a transverse bar 140, preferably similar to the corresponding part shown in my said patent. The forward edge of the said pusher 138 has a downturned serrated portion 141, whereby the members of a row of cakes of the determined number are positioned directly beneath the nipples 82 of the jelly-containing hopper 52. The inner or free end of the pusher 138 is received for sliding movement upon a plate 142 secured to the machine frame and extending from one side thereof to the other and preferably terminating just in the rear of the nipples 82.

To the forwardly extending side portions 143 of the frame of the pusher 138 are pivotally connected at 144 the arms 145 of a second pusher 146 generally similar in construction to the pusher 138 and having a forward, downwardly extending, serrated, front edge 147, by which the row of cakes, which has received the jelly deposit from the hopper 52 is brought into proper position beneath the nipples 96 of the marshmallow hopper 27.

It is necessary that the pusher 146 shall not interfere with the on-coming cakes that have received the jelly deposit 52, but that they be intermittently moved to a position in the rear of the forward row of cakes, so as in turn to push them beneath the said nipples 96. While this result may be effected in any suitable manner, I have herein at one side of the machine frame provided an upstanding bracket 148 having therein a longitudinal slot 149 to receive a strip 150 for adjustment in said slot. Pivotally connected to the forward end strip 150 at 151 is a downwardly extending wedge-like member or latch 152 normally downwardly spring pressed, as by a coil spring passing about the pivot 151, and beneath which a laterally extending pin or roll 153 upon the pusher is adapted to pass. Pivotally connected at 154 to the rear end of the said strip 150 is a wedge-like member or latch 155 normally upwardly spring pressed, as by a suitable spring extending about the pivot 154 thereof. Slightly to the rear of the latch 155 is a downwardly inclined guide 156.

The construction and arrangement of parts are such that in the forward movement of the pusher 146, it passes beneath and elevates the wedge-like member or latch 152, which immediately returns to the position indicated in Fig. 4. Upon the rearward or return movement of the pusher 146, the roll 153 thereof rides up the latch 152, then rearwardly along the strip 150 and along the latch 155 which it depresses, and finally onto the rear portion of the guide 156. Immediately the latch 155 is elevated into the position shown in Fig. 4, and the pusher 146 is permitted to descend along the guide 156 onto the apron 51, the timing of the parts being such that the leading row of cakes has just been advanced by the pusher 138 into a position somewhat in advance of the guide 156, so that the said pusher 147 is restored to the level of the apron 51 immediately in the rear of said leading row of cakes, and in such manner as to push them at the proper time directly beneath the nipples 96, where they receive a charge of marshmallow that is superimposed upon the jelly charge already upon the cake.

Any suitable means may be provided to impart to and fro movement to the pushers 138, 146. Preferably for this purpose, as shown most clearly in Fig. 1, the frame of the pusher has pivotally connected thereto at its rear end at 157 links, one of which is represented at 158. The forward ends of the said links are pivotally connected at 159 to a pair of rocker arms 160 fast upon a rock shaft 161 mounted in suitable bearings upon the machine frame. The said rock shaft 161 may be operated in any suitable manner and preferably as disclosed in my said patent.

In my said patent, I have disclosed one form of means whereby a portion of the upper run of the cake-receiving apron is periodically elevated for the purpose of bringing the cakes in closer relation to the nipples of the hopper. An important purpose of so intermittently elevating a portion of the top run of the apron is to bring the cakes to such an elevation that they may be permitted to descend sufficiently to sever the streams of material issuing from the nipples. By positioning the upper run of the apron, either permanently or intermittently, in suitable relation to the said nipples and by suitably and preferably forcibly discharging the material through the said nipples, I insure the proper spreading action of the material discharged through said nipples.

Preferably though not necessarily I employ a similar action in the disclosed embodiment of my invention, and for that purpose I have provided beneath the upper run of the apron 51 a plate 162 supported for rising and falling movement by pins 163, 164 mounted in suitable guides 165, 166. In order to impart intermittent vertical movement to said pins 163, 164, I provide a pair of rocker arms 167, 168, the free ends whereof take under the heads of said pins. Said rocker arms are fast upon rock shafts 169, 170, which are provided with crank arms, one of which is shown at 171 in Fig. 1. The said crank arms are connected by a link 172 so as to insure unison movement of the said crank arms, and rising and falling movement is imparted in any suitable manner to said connected crank arms 171. For this purpose, I preferably provide means similar to those shown in my said patent.

In Fig. 2, I have represented one of the links 171 as having pivotally connected thereto at 173 an upright link 174, the lower end of which is pivotally connected at 175 to a rock arm 176 pivoted at 177 upon the machine frame. Upwardly extending from the said rock arm 176 is a bar 178 carrying a roller 179 engaging the periphery of a cam 180 upon a shaft 31. The contour of said cam in such as to impart rising and falling movement to a portion of the upper run of the apron 51 at the proper time.

From the foregoing description, it will be evident that the cakes are deposited a row at a time upon the upper face of the pusher 138, and that as disclosed in said patent, they drop in front of said pusher and are thereby properly alined. They are then positioned beneath the nipples 82 where each of them receives a deposit of jelly or other material forcibly discharged through said nipples. The said row of cakes is then further advanced by said pushers and is received by the front pusher 146 and advanced by it beneath the nipples 96 of the marshmallow hopper 27. The timing of parts is such that at the same instant the first mentioned row of cakes is positioned beneath the nipples of the hopper 27, the next row of cakes, received by the pusher 138, is simultaneously positioned beneath the nipples 82. Therefore, in the continued operation of the apparatus, there is a simultaneous deposit of jelly upon the one row of cakes and of marshmallow upon the jelly upon the row of cakes immediately in advance thereof. At a proper time, and preferably just prior to, or it may be simultaneously with the discharge of jelly and marshmallow from the hoppers 52, 27, I elevate a portion of the upper run of the apron 51, so as to bring the said cakes close to the nipples and so that the material when forcibly discharged therethrough spreads sufficiently upon and preferably substantially covers the entire upper surface of the said cakes. This spreading movement may, however, be effected in any other suitable manner. It is desirable, however, that the apron be elevated as described in this embodiment of my invention, so that it may be permitted quite rapidly to fall, and thus to break the streams of material that have issued from the nozzles 82 and 96, and thus to insure an evenly iced or jellied cake.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Means for depositing fluent material upon cakes or other food products comprising in combination, an article support, a plurality of separate means to deposit upon said articles in succession while on said support coating quantities of contrasting fluent materials, and separate pusher means respectively and independently to position the articles beneath said depositing means, and to preserve the articles out of contact with each other while on said support.

2. Means for depositing fluent material upon cakes or other food products comprising in combination, an article support, a plurality of separate means to deposit upon said articles in succession while on said support, coating quantities of contrasting fluent materials, and separate positioning means respectively and independently to position the articles beneath said depositing means and to preserve the articles out of contact with each other while on said support.

3. Means for depositing fluent material upon cakes or other food products comprising in combination, a traveling belt, a plurality of separate means to deposit upon said articles in succession while on said belt coating quantities of contrasting fluent material, and two separate pusher means respectively and independently to position the article beneath said respective depositing means, and to preserve the articles out of contact with each other while on said support, one of said pusher means having forward and return strokes in different paths.

4. Means for depositing fluent material upon cakes or other food products comprising in combination, a traveling belt, a plurality of separate means to deposit upon said articles in succession while on said belt coating quantities of contrasting fluent material, and two separate pushers, one having to and fro movement along the belt and the other having a pushing movement in one direction along the belt, and a return movement while out of contact with said belt, whereby said pushers respectively and independently position the articles beneath said successive depositing means and whereby they preserve said articles out of contact with each other while on said support.

5. Means for depositing fluent material upon cakes or other food products comprising in combination, an article support, a plurality of separated means to deposit upon said articles in succession while on said support coating quantities of contrasting fluent materials, valves respectively controlling the depositing means, means to effect synchronous movement of said valves, and separate pusher means respectively and independently to position the articles beneath said respective depositing means and to preserve the articles out of contact with each other while on said support.

6. Means for depositing fluent material upon cakes or other food products comprising in combination, an article support, a plurality of separate means to deposit upon said articles in succession while on said support, coating quantities of contrasting fluent materials, separate pusher means respectively and independently to position the articles beneath said depositing means and to preserve the articles out of contact with each other while on said support, and means periodically to elevate and lower the article support.

7. Means for depositing fluent material upon cakes or other articles comprising in combination, depositing means at two spaced points, a support for the articles beneath said depositing means, two separated pushers independently to present respectively cakes at said points, and means to operate said pushers to prevent contact of said articles upon said support, and means to prevent interference of the foremost pusher with the material acted upon by the other pusher.

8. Means for depositing fluent material upon cakes or other food products comprising in combination, two spaced hoppers for the fluent material, a single conveyer, and co-acting separated pusher means to position cakes beneath said hoppers simultaneously, means to operate said separated pusher means to prevent contact of said cakes with each other while on said conveyer, means to raise the said cakes to receive fluent material from the hoppers, and means to lower the cakes to break the streams of fluent material.

9. Means for depositing fluent material upon cakes or other products comprising in combination, a traveling support for food products, two hoppers positioned thereover, one of said hoppers having agitators and a plunger, and the other hopper having a plunger, discharge valves for both hoppers, means to move said valves in unison, two separated pushers adapted respectively and independently to position separated rows of cakes beneath said hoppers respectively, means to operate said pushers, thereby to prevent contact of said cakes while upon said support, and means periodically to lift said traveling food support toward said hoppers.

10. Means for depositing fluent material upon cakes or other products comprising in combination, a support for food products, two spaced hoppers positioned over said support, a plunger in each hopper, a discharge valve below each plunger, means simultaneously to open both said valves and simultaneously to impart ejecting movements to said plungers, a pusher to position food products beneath the outlet of the first hopper, and a pusher member connected to the first mentioned pusher but spaced therefrom and adapted independently to position food products beneath the outlet of the second hopper substantially simultaneously with the positioning of the food products beneath the outlet of the first hopper and means to operate said pusher members to prevent contact of said cakes while upon said support.

11. Means for depositing fluent material upon cakes or other products comprising in combination, a support for food products, first and second spaced hoppers positioned over said support, a plunger in each hopper, a discharge valve below each plunger, means simultaneously to open both said valves and simultaneously to impart ejecting movements to said plungers, a hopper 15 to receive the food products, a pusher having reciprocatory movement beneath said hopper 15 and adapted to receive food products directly from said hopper 15 and to effect their deposit directly upon said support, a second pusher coöperating with but spaced from said pusher to position food products independently beneath the second hopper and means to operate said pusher to prevent contact of said cakes with each other while on said support as well as to position said cakes simultaneously beneath said two spaced hoppers.

12. Means for depositing fluent material upon cakes or other products comprising in combination, a support for food products, first and second spaced hoppers positioned over said support, a plunger in each hopper, a discharge valve below each plunger, means simultaneously to open both said valves and simultaneously to impart ejecting movements to said plungers, a hopper 15 to receive the food products, a pusher having reciprocatory movement beneath said hopper 15 and adapted to receive food products directly from said hopper 15 and to effect their deposit directly upon said support, a pusher member pivoted to said pusher but spaced therefrom and having to and fro movement in different planes and adapted independently to position food products beneath said second hopper, and means to operate said pusher to prevent contact of said cakes with each other while on said support as well as to position said cakes simultaneously beneath said two spaced hoppers.

13. Means for depositing fluent material upon cakes or other food products comprising in combination, a support for food products, two spaced hoppers 52 and 27 positioned thereover, plungers in said hoppers, discharge valves beneath said plungers, a hopper 15 for the food products, a positioning member 138 between the support and hopper 15, a positioning member pivoted to the pusher 138, but effectively spaced therefrom, and means for imparting discharge movement to said plungers substantially simultaneously with the positioning by said pusher and pusher member of food products between said hoppers 52 and 27 and means whereby said pusher 138 and said pusher member simultaneously and independently position food products beneath said two hoppers 52 and 53, and whereby said pusher and pusher member preserve the cakes from contact with each other while on said support.

14. Means for depositing fluent material upon cakes or other food products comprising in combination, a support for food products, two spaced hoppers positioned thereover, means for effecting a discharge from each hopper, a two member pusher the members whereof independently present food articles beneath both of said hoppers, one of said pusher members being pivoted to the other, and effectively spaced therefrom, guiding means to effect reciprocating movement of the pivoted pusher member in two different paths, said guiding means including a strip 150 having a yielding pivoted latch at each end thereof and whereby said pusher and pusher member preserve the cakes from contact with each other while on said support.

15. Means for depositing fluent material upon cakes or other food products comprising in combination, a traveling support for food products, means periodically to elevate a portion of said support and including two bell crank levers and connecting means therebetween and operating means therefor, two spaced hoppers positioned over said support, a plunger in each hopper, a discharge valve for each hopper, a food product positioner having two members effectively spaced from each other, and means to operate said plungers, valves and pushers so as substantially simultaneously and independently to position food products beneath said hoppers, to open the valves of said hoppers and to impart ejecting movements to said plungers and whereby said pusher and pusher member preserve the cakes from contact with each other while on said support.

16. Means for depositing fluent material upon cakes or other food products comprising in combination, an article support, two spaced hoppers thereabove adapted to deposit upon said articles in succession while on said support coating quantities of contrasting fluent material, two separate food product positioning means respectively and independently to position rows of articles beneath said respective hoppers and to preserve the articles out of contact with each other while on said support, plungers in said hoppers, and means to impart expelling movement to said hoppers sequentially after the positioning action of the said separate positioning means.

17. Means for depositing fluent material upon cakes or other food products comprising in combination, an article support, two hoppers arranged at spaced points along said support and having discharge openings spaced along said support, a discharge valve for the opening of each hopper, means for effecting simultaneous movement of said valves, whereby the material is simultaneously discharged from the two hoppers at spaced points along the support, separated food product positioning means respectively and independently to position the articles beneath said two hoppers and to preserve the articles out of contact with each other while upon said support, expelling plunger means in said hoppers and means to impart expelling movement to said plungers sequentially after the positioning movement of said separate positioning means.

In testimony whereof, I have signed my name to this specification.

EDWARD LEGLER.